United States Patent
Mitomi et al.

(10) Patent No.: US 6,941,309 B2
(45) Date of Patent: Sep. 6, 2005

(54) OBJECT INTEGRATED MANAGEMENT SYSTEM

(75) Inventors: Atsushi Mitomi, Yokohama (JP); Masaaki Oya, Yokohama (JP); Toshiaki Hirata, Kashiwa (JP); Akihiro Urano, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 447 days.

(21) Appl. No.: 10/020,903

(22) Filed: Dec. 19, 2001

(65) Prior Publication Data

US 2002/0091705 A1 Jul. 11, 2002

(30) Foreign Application Priority Data

Dec. 19, 2000 (JP) ........................................ 2000-385355

(51) Int. Cl.$^7$ ............................................. G06F 17/00
(52) U.S. Cl. ..................................................... 707/100
(58) Field of Search ............................... 707/1, 8, 100, 707/103 R, 200; 709/203; 718/103; 719/318; 345/804, 853

(56) References Cited

U.S. PATENT DOCUMENTS 5,361,349 A * 11/1994 Sugita et al. ................. 707/8
6,134,559 A * 10/2000 Brumme et al. ......... 707/103 R
6,499,036 B1 * 12/2002 Gurevich ................ 707/103 R

* cited by examiner

Primary Examiner—Safet Metjahic
Assistant Examiner—Etienne P LeRoux
(74) Attorney, Agent, or Firm—Mattingly, Stanger, Malur & Brundidge, P.C.

(57) ABSTRACT

An object integrated management system achieves flexibility for modifications of management targets, efficiency of integrated management processing, and reduction in system management, building, and maintenance costs. The object integrated management system manages real data managed by data management systems in an integrated manner, and comprises: a repository that stores virtual objects respectively created correspondingly to real data, virtual object metamodels defining the virtual objects, adapter objects having configuration information of the data management systems and a function of access processing for real data stored in the data management systems, and adapter object metamodels defining the adapter objects; a metamodel management part that manages the virtual object metamodels and adapter object metamodels within the repository; and an object management part that manages the virtual objects and adapter objects, and uses the adapter objects to access real data.

3 Claims, 12 Drawing Sheets

OBJECT INTEGRATED MANAGEMENT SYSTEM

BACKGROUND OF THE INVENTION

The present invention relates to a system that manages data of different formats such as databases and servers distributed in network environments in an integrated manner.

Conventionally, various types of databases have been generally installed in corporations. There is usually no compatibility between these databases. There sometimes occurs a need to add or delete data management systems that manage data of different formats, including such databases and servers distributed in network environments.

In Japanese Published Unexamined Patent Application No. Hei 11-96054, there is described a database integrated application building system that, as a method for equivalently treating object storage locations without paying special attention to them, creates logical objects representing objects by logical layers and connector objects including access to the objects, and manages correspondence between the two using a conversion table. Herein, where objects are managed in an integrated manner, connector objects including access to the objects and the conversion table must be modified, and a method for managing items subject to integrated management must be devised because the structures of them are managed in a distributed form.

To access distributed different data in a unified manner, in Japanese Published Unexamined Patent Application No. Hei 11-96054, logical objects and connector objects are provided and a conversion table is used to manage correspondences between the two. When new data is added to a data integrated management system as a management target, addition of a logical object and a connector object and modification of the conversion table are required. This method has a problem in that it lacks flexibility of system expansion and change and is poor in system management and maintenance cost.

BRIEF SUMMARY OF THE INVENTION

The present invention provides an object integrated management system that can manage the structures of various distributed data and access processing at a metamodel management part in a centralized form, and manages objects according to the metamodels, thereby achieving efficiency of data integrated management processing and reduction in maintenance costs required for system configuration management.

To achieve the above-described object, a repository is used in which class definitions as a metamodel part and instances of the classes as an object part are stored as permanent objects according to object orientation. In the metamodel part of the repository, virtual object metamodels and adapter object metamodels are stored, while, in the object part, virtual objects corresponding to real data and adapter objects having a function to access the real data from the virtual objects are stored. To manage these, a metamodel management part (creating, deleting, and modifying metamodel information) and an object management part (creating, deleting, and modifying objects) are respectively provided, whereby an object integrated management system is built. Further, the metamodel management part arranges real data and data management systems managing it into models and manages the models as metamodels. The object management part manages objects used as instances of the metamodels managed in the metamodel management part. The metamodel management part centrally manages the configuration of data management systems to be managed by the object integrated management system. The object management part creates instances of virtual objects and adapter objects from metamodels. The metamodel information is managed using an interface provided by the object integrated management system.

Herein, arranging a data management system into a model denotes, if the data management system is a relational database, representing the database by the name, format, table structure, column name, and the like of the database. A metamodel is definition information defining a model.

DETAILED DESCRIPTION

Figure 1:
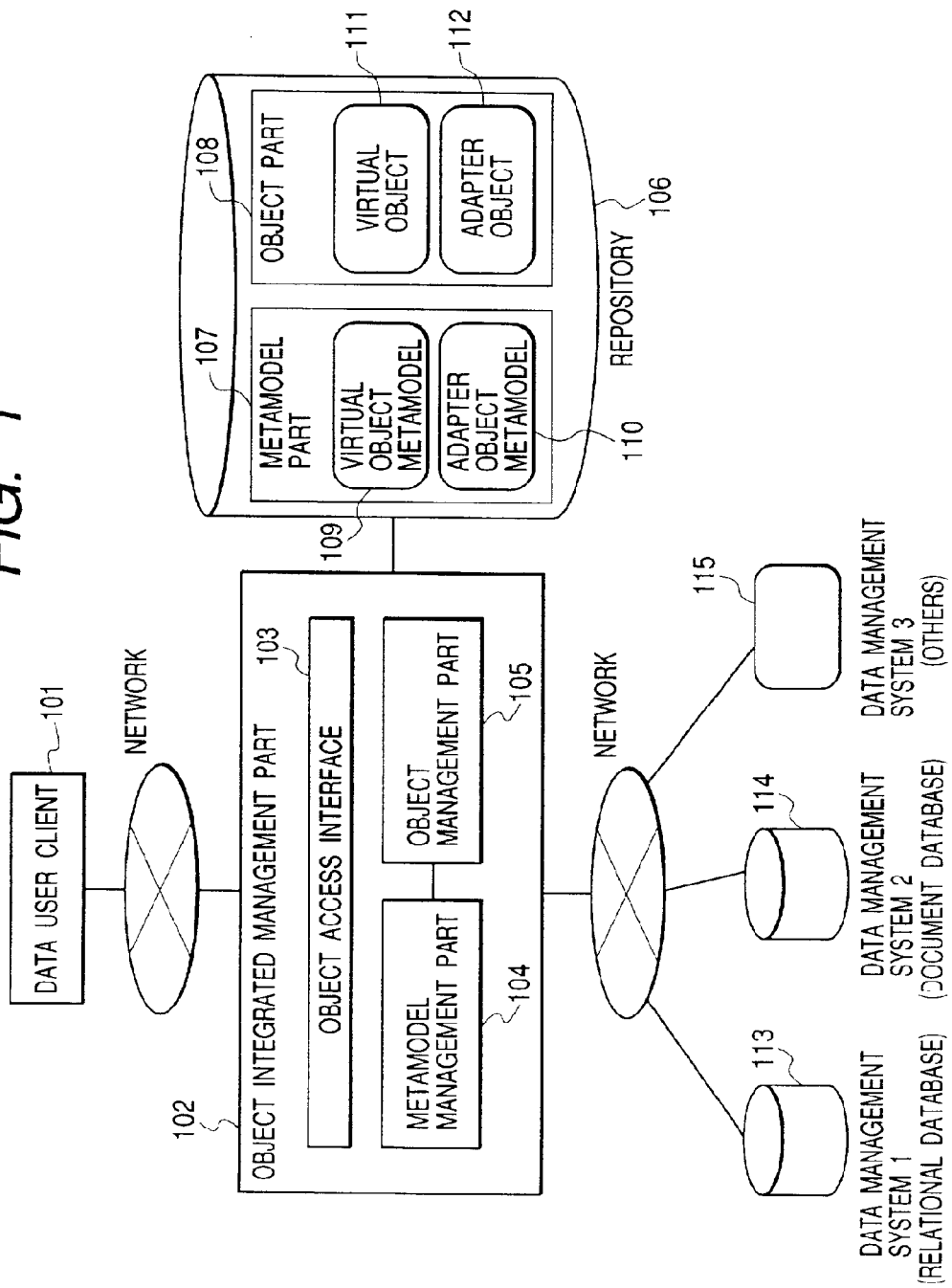
FIG. 1 is a diagram showing the overall configuration of an object integrated management system.

Hereinafter, embodiments of the present invention will be described with reference to the accompanying drawings. FIG. 1 is a diagram showing an embodiment of an object integrated management system of the present invention. An object integrated management part (102) includes a metamodel management part (104) and an object management part (105), and stores information managed by them in a repository (106). Real data subject to integrated management exists in distributed form in network environments, and different data management systems exist depending on the types of the real data. There exist a data management system 1 (113) that uses a relational database, a data management system 2 (114) that uses a document database to store document data and the like, and a data management system 3 (115) that uses other databases, or aside from databases, manages real data and provides a means for accessing the real data.

The object integrated management part (102) achieves integrated management for real data managed by the data management systems 1 to 3 (113, 114, 115) of these various forms. The object integrated management part (102) uses the metamodel management part (104) and the object management part (105) to manage system and data configuration information for the data management systems 1 to 3 (113, 114, 115) and real data managed therein and perform access processing for the real data. The object management part (105) manages objects (111, 112) as instances of metamodel (109, 110) class defined in the metamodel management part (104). To manage real data held in the data management systems 1 to 3 (113, 114, 115), the object management part (105) uses configuration information such as the locations and types of the data management systems 1 to 3, and an adapter object (112) having a function of access processing for real data stored in the data management systems to access the real data.

A data user (101), without considering the locations and storage formats of real data, can access in a unified manner the real data held in the plural data management systems 1 to 3 (113, 114, 115) by using an object access interface (103) provided by the object integrated management part (102). The object integrated management part (102) provides functional extensibility of integrated management for the various data management systems 1 to 3 (113, 114, 115) by adding the adapter object.

Figure 2:
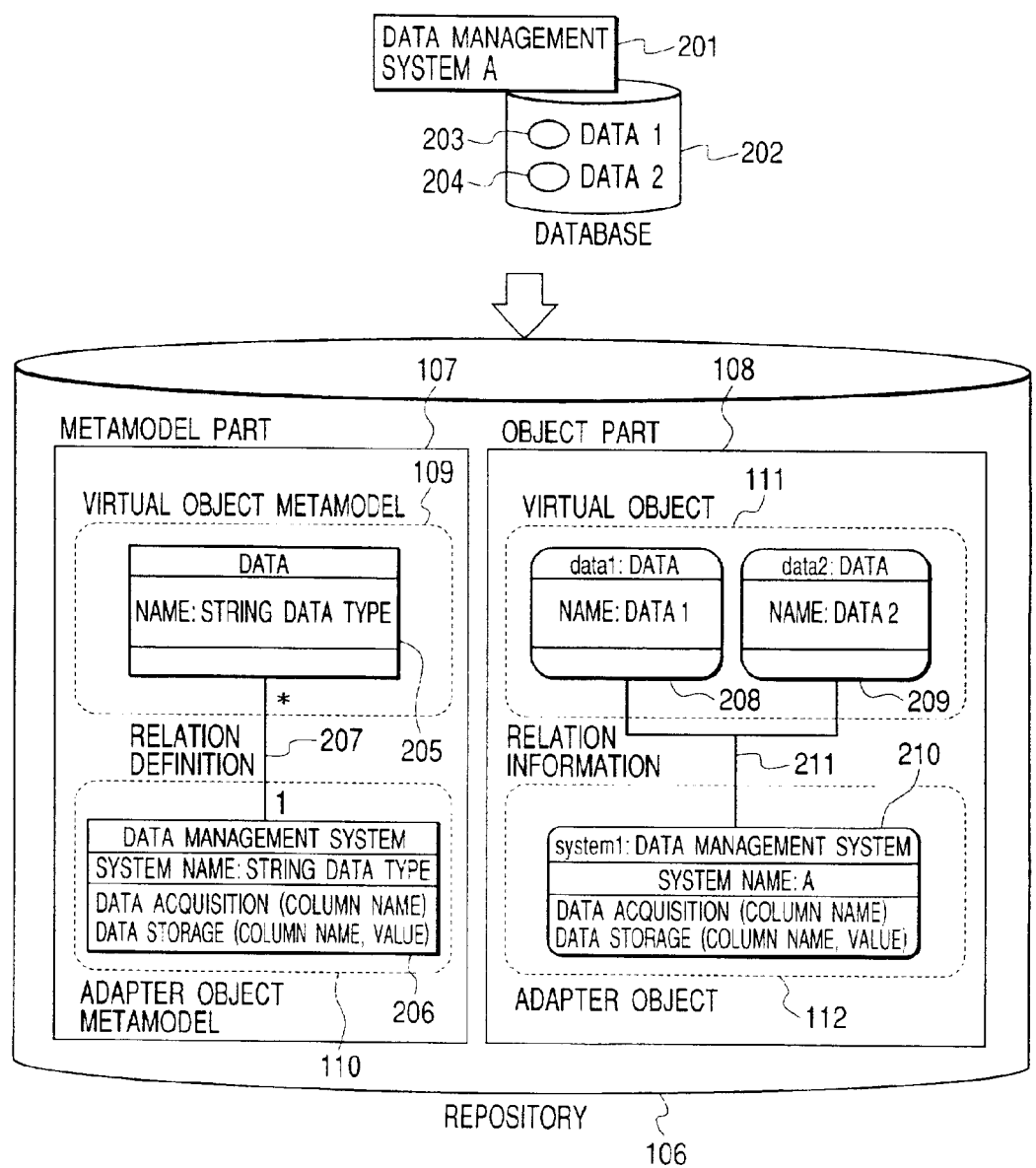
FIG. 2 is a diagram showing the format of data stored in a repository by the object integrated management system.

FIG. 2 shows the format of data stored in the repository (106). Data stored in the repository (106) is classified into a metamodel part (107) and an object part (108). When the data management system A (201) holds data 1 (203) and data 2 (204) in a database (202), it is defined that class DATA (205) exists as a metamodel (109) of a virtual object and "name" as its attribute value is character type. It is defined that the class of a data management system (206) exists as a metamodel (110) of adapter object, "system name" as its attribute value is string data type, and acquisition and storage of real data is performed as its operation. This processing is performed using an access language provided by the database (202). In other words, the adapter object metamodel (110) has the definition of a data manipulation method. A relation is defined (207) between the DATA class and the data management system class.

The object part stores virtual objects (111) and an adapter object (112) as instances of the classes defined in the metamodel part. As the virtual objects (111), data 1 (208) and data 2 (209) objects exist correspondingly to data 1 (203) and data 2 (204) stored as real data in the database (202). Thus, there are as many virtual objects as the number of pieces of data.

A system 1 (210) object exists as an adapter object (112). One adapter object exists for each data management system. The adapter object, although defined previously, has the function of fetching or writing real data, based on virtual objects. To be more specific, it has a method comprising compiled program modules. The virtual objects and the adapter object are instances of the respective metamodels. When the instances are created, according to a relation definition (207) defined between the metamodels, relation information (211) is set among the objects data1 (208), data2 (209), and system1 (219). The relation information (211) is set in such a way that the objects hold (specifically provide pointers) reference of related objects internally according to an object orientation.

Figure 3:
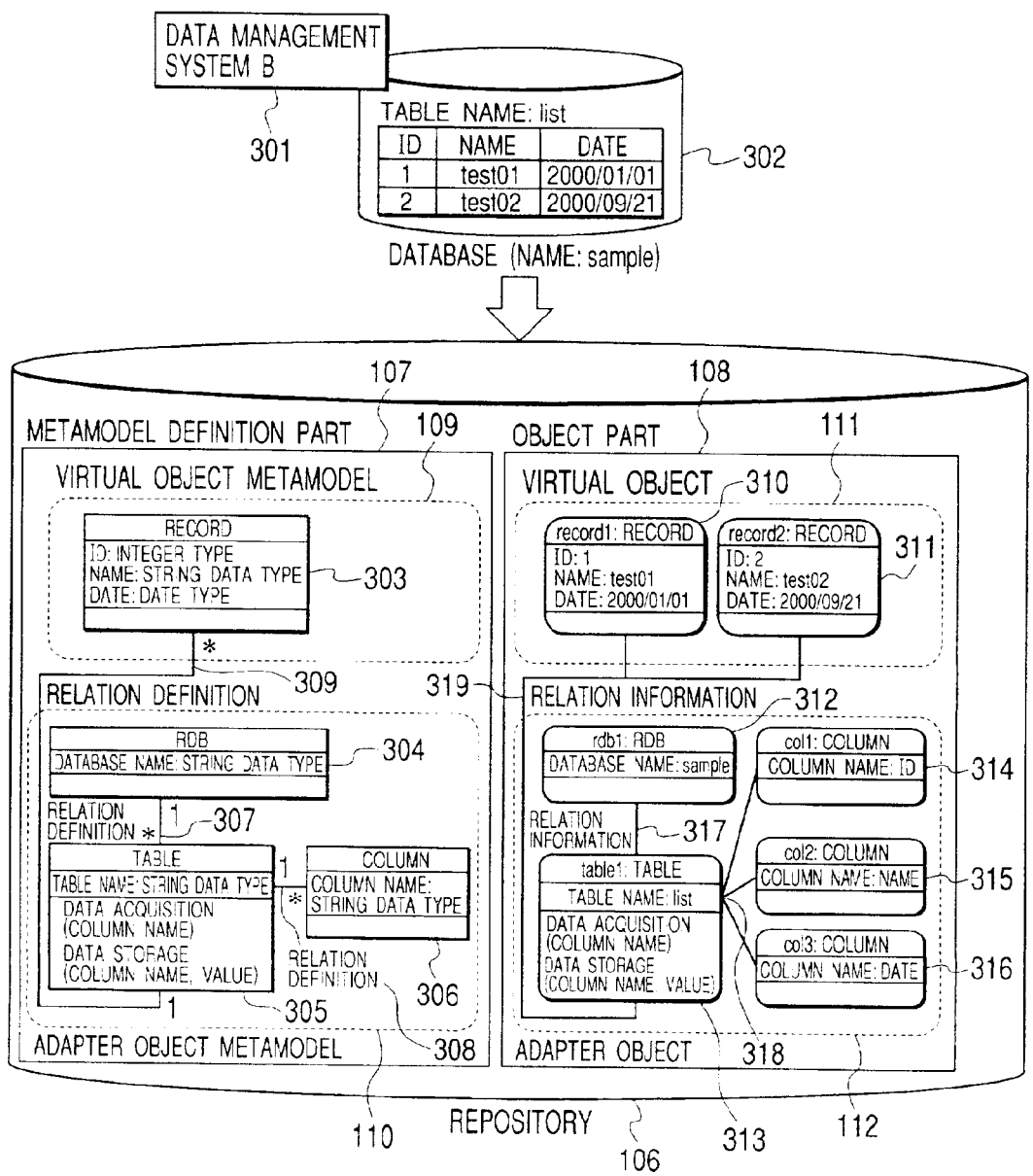
FIG. 3 is a diagram showing the format of data when a management target system is a relational database, as an example of FIG. 2.

FIG. 3 shows a specific example of the formats of data stored in the repository (106) when a database (302) of a data management system B (301) is a relational database. A metamodel (110) of an adapter object of the metamodel part (107) comprises classes RDB (304),TABLE (305), and COLUMN (306) that are arranged into a model of the relational database and relation definitions (307, 308) thereof.

The object part (108) includes rdb 1 (312), table 1 (313) col1 (314), col2 (315), and col3 (316) objects as the adapter object (112), and relation information (317, 318) among them. The relation information is set in such a way that the objects hold reference of related objects internally according to an object orientation. These objects (312 to 316) constituting the adapter object (112) are created according to the structure of a table existing in the database (302). The virtual objects (111) are created correspondingly to records existing in the table of the database (302). Column values of the records are stored as the attribute values of the virtual objects (111).

Figure 4:
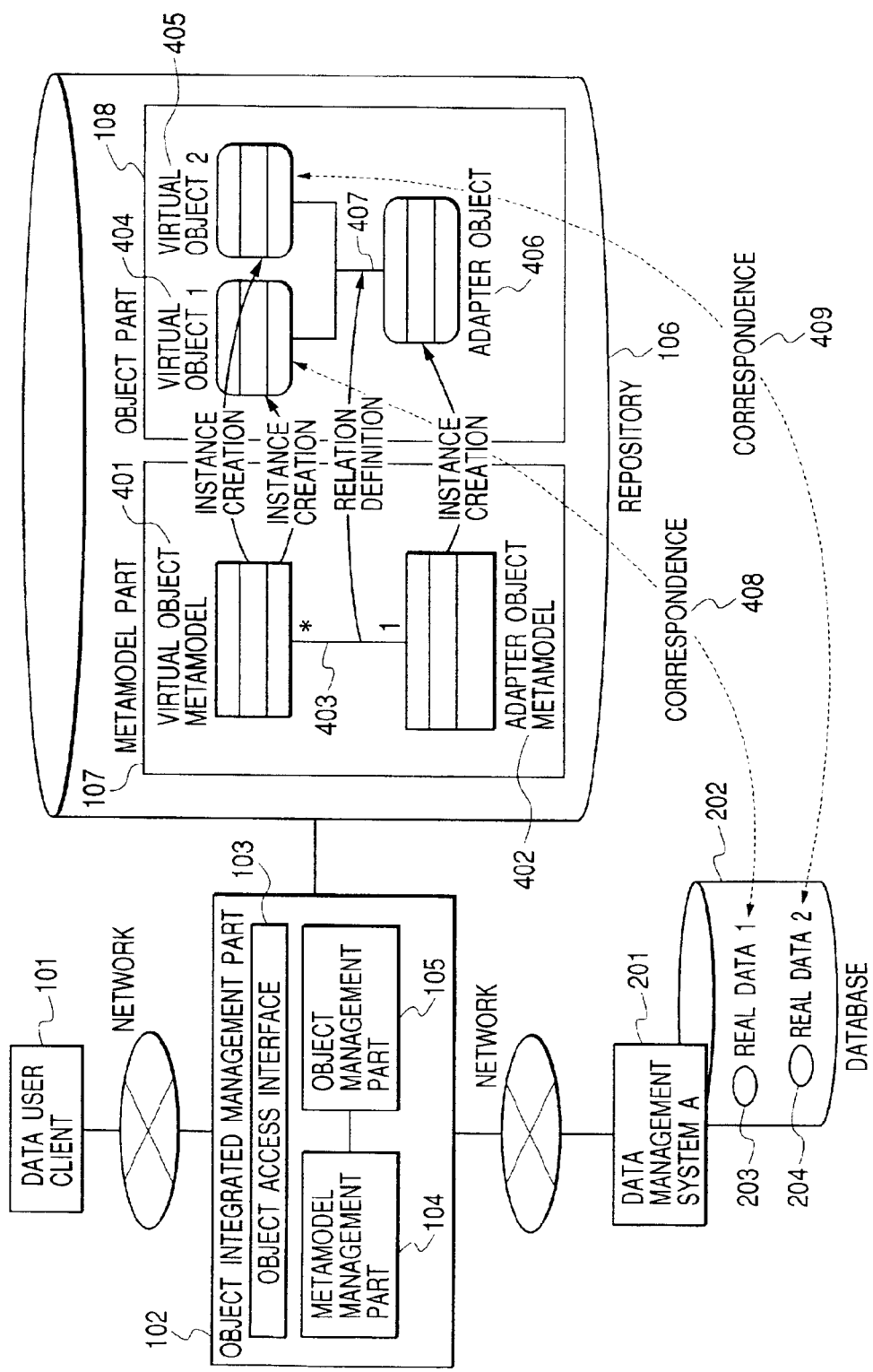
FIG. 4 is a diagram showing a relationship between the structures of metamodel definitions and objects managed in the object integrated management system.

FIG. 4 shows a relationship among metamodels and objects within the repository (106) in the object integrated management system, and real data held in the data management system. The relationship will be described with reference to a flowchart of FIG. 5. The object integrated management system (102) receives a request to the metamodel management part (104) to create an adapter object (406) through the object access interface (103) (501).

On receiving the request, the metamodel management part (104) requests the repository (106) to create the adapter object (406) (502), and the repository (106) creates an instance of adapter object metamodel (402) and stores it as the adapter object (406) (503, 504). The metamodel management part (104) uses the adapter object (406) to refer to the database (202) of the data management system A (201) and obtain real data (505). If real data exists (506), the repository (106) creates a virtual object 1 (404) as an instance of a virtual object metamodel (401), correspondingly (408) to the real data 1 (203) (507, 508). The virtual object 1 (404) sets a relation (407) with the adapter object (406) according to a relation (403) defined in a metamodel definition part (509). This processing is automatically performed by being included in a constructor called when creating an instance.

The repository (106) stores the created virtual object 1 (404) (510), and also for remaining real data 2 (204), creates and stores a corresponding (409) virtual object 2 (405) (511). The object management part (105) manages the virtual objects stored in the repository (106) with these relations, whereby the object integrated management system (102) manages real data held in various types of data management systems in an integrated manner.

Although the above example has been described as to the case where real data (203, 204) is stored in the database (202) without being limited to databases, real data for which access means are available, such as files stored in storage units, distributed objects, and dynamic data on a memory to which reference can be made by a protocol can also be managed in an integrated manner as virtual objects by including access processing for the real data in an adapter object.

Figure 6:
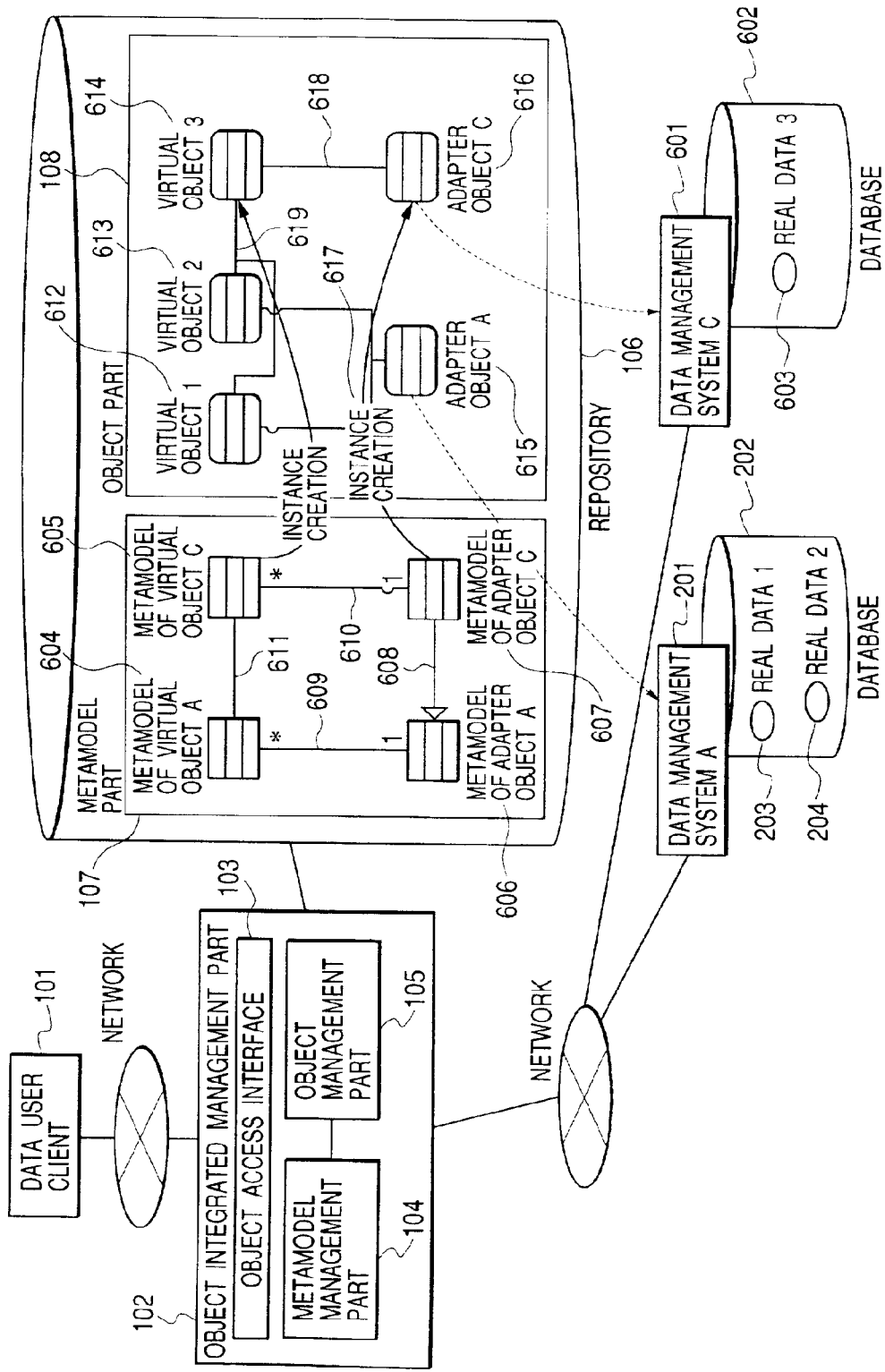
FIG. 6 is a diagram showing the structures of metamodel definitions and objects when a data management system to be managed by the object integrated management system is added.
Figure 7:
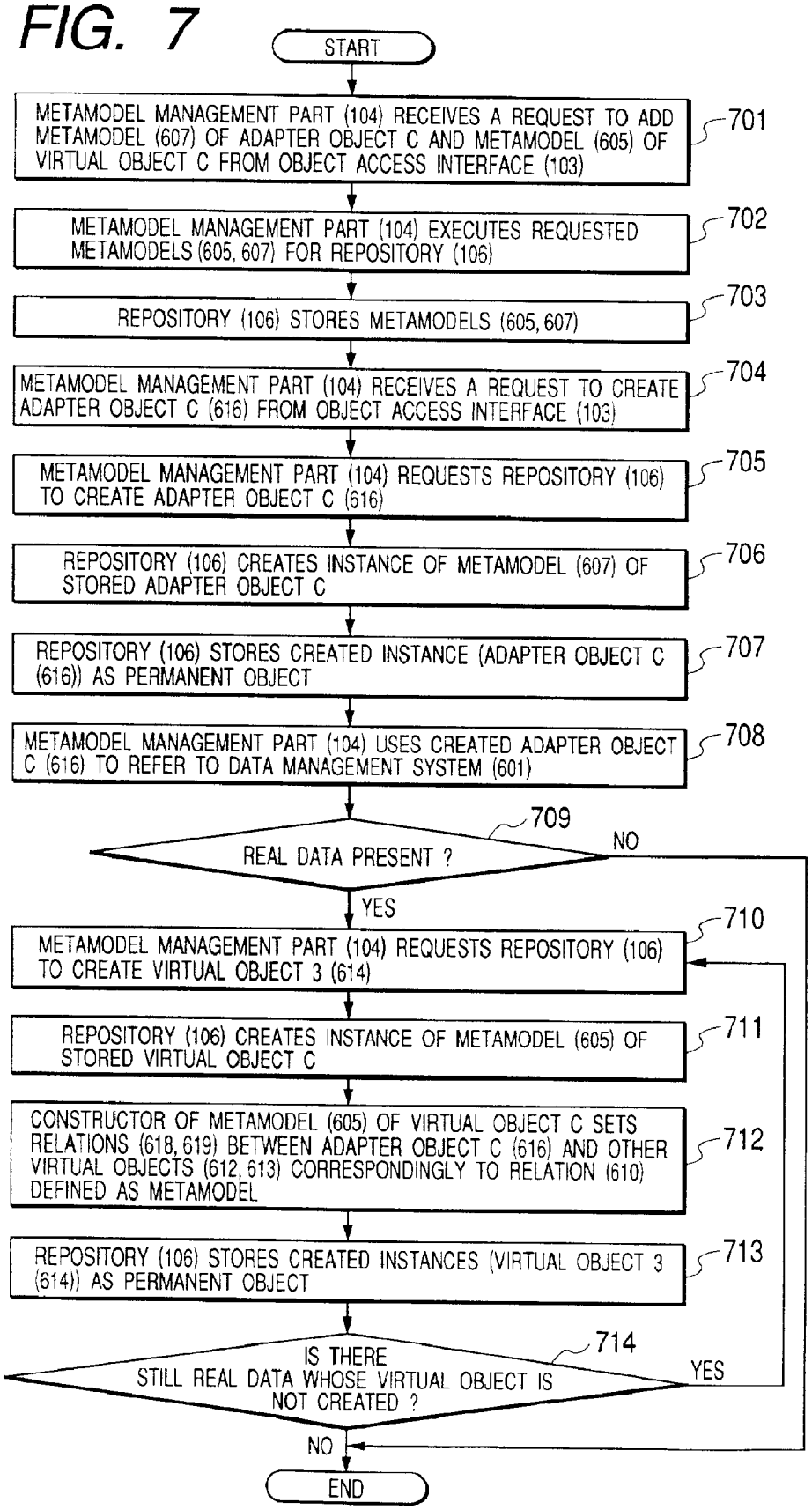
FIG. 7 is a diagram showing processing when a data management system to be managed by the object integrated management system is added.

FIG. 6 shows how processing is performed when a data management system is newly added. This processing will be described with reference to a flowchart of FIG. 7. Linkage with the data management system A (201) is already defined, and there exist in the repository (106) a metamodel (604) of a virtual object A, a metamodel (606) of an adapter object A, and their instances, a virtual object 1 (612), a virtual object 2 (613), and an adapter object A (615). A description will be made of the case where a data management system C (601) is newly linked in this state.

First, when the data user (101) requests the object integrated management part (102) to add the data management system C (601), the metamodel management part (104) receives a request to add a metamodel (607) of an adapter object C and a metamodel (605) of a virtual object C through the object access interface (103) (701).

Next, the metamodel management part (104) performs processing for storing the requested metamodels (605, 607) in the repository (106) (702), and the repository (106) stores the requested metamodels (605, 607) (703).

At this time, if a database (602) of the data management system C (601) is an access means similar to the database (202) of the data management system A (201), it is defined that the metamodel (607) of the adapter object C has an inheritance relation (608) with the metamodel (606) of the adapter object A. In FIG. 6, the arrow of the relation definition (608) indicates that the metamodel of the adapter object C inherits the metamodel of the adapter object A. Thereby, access processing included in the metamodel (606) of the adapter object A can be reused in the metamodel (607) of the adapter object C. When a data management system of the same type is added, plural instances can be created as the adapter object C (616) from the metamodel (606) of the existing adapter object A. By defining a relation (611) between metamodels of virtual objects, the relation of real data between different data management systems can be handled. Specifically, defining relations between metamodels means that they mutually have pointers to objects of counterparts with a 1-to-n relation.

Figure 5:
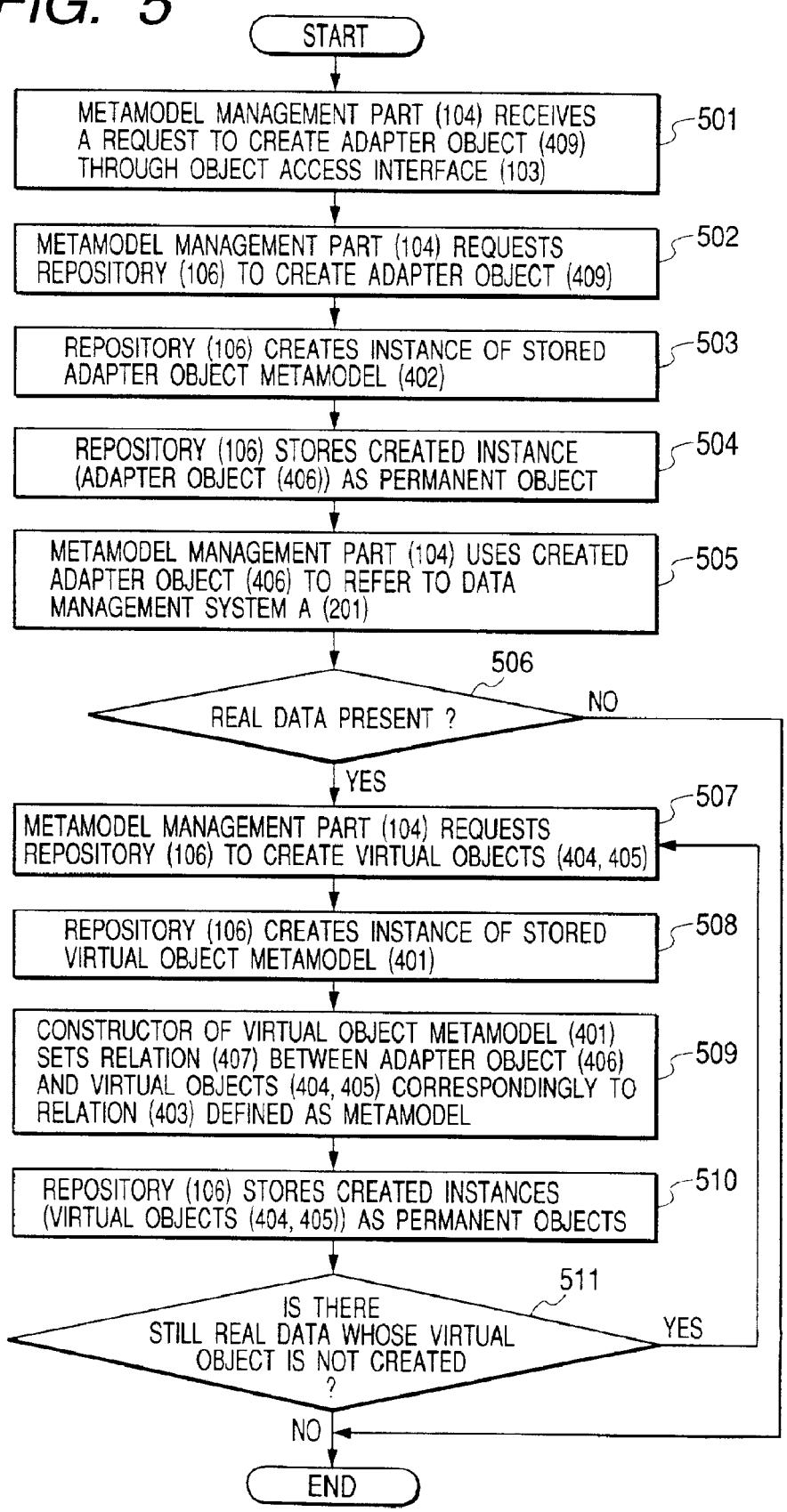
FIG. 5 is a flowchart showing how objects are formed from metamodel definitions managed in the object integrated management system.

Next, as instances of the added metamodel definition, as in FIG. 5, an adapter object C (616) and a virtual object 3 (614) are created (704 to 714). At this time, a relation (619) between virtual objects is set in instance creation processing of the virtual object 3 (614) (712). These processings are requested by the object access interface (103) provided by the object integrated management part (102), and the adapter object and the virtual object are thus stored in the repository (106) as instances of the respective metamodels, whereby the object integrated management part (102) can newly add the data management system C (601).

Likewise, linked data management systems can be deleted or modified. By using an object access interface (103), the object integrated management part (102) provides a function of flexible and efficient configuration management.

Figure 8:
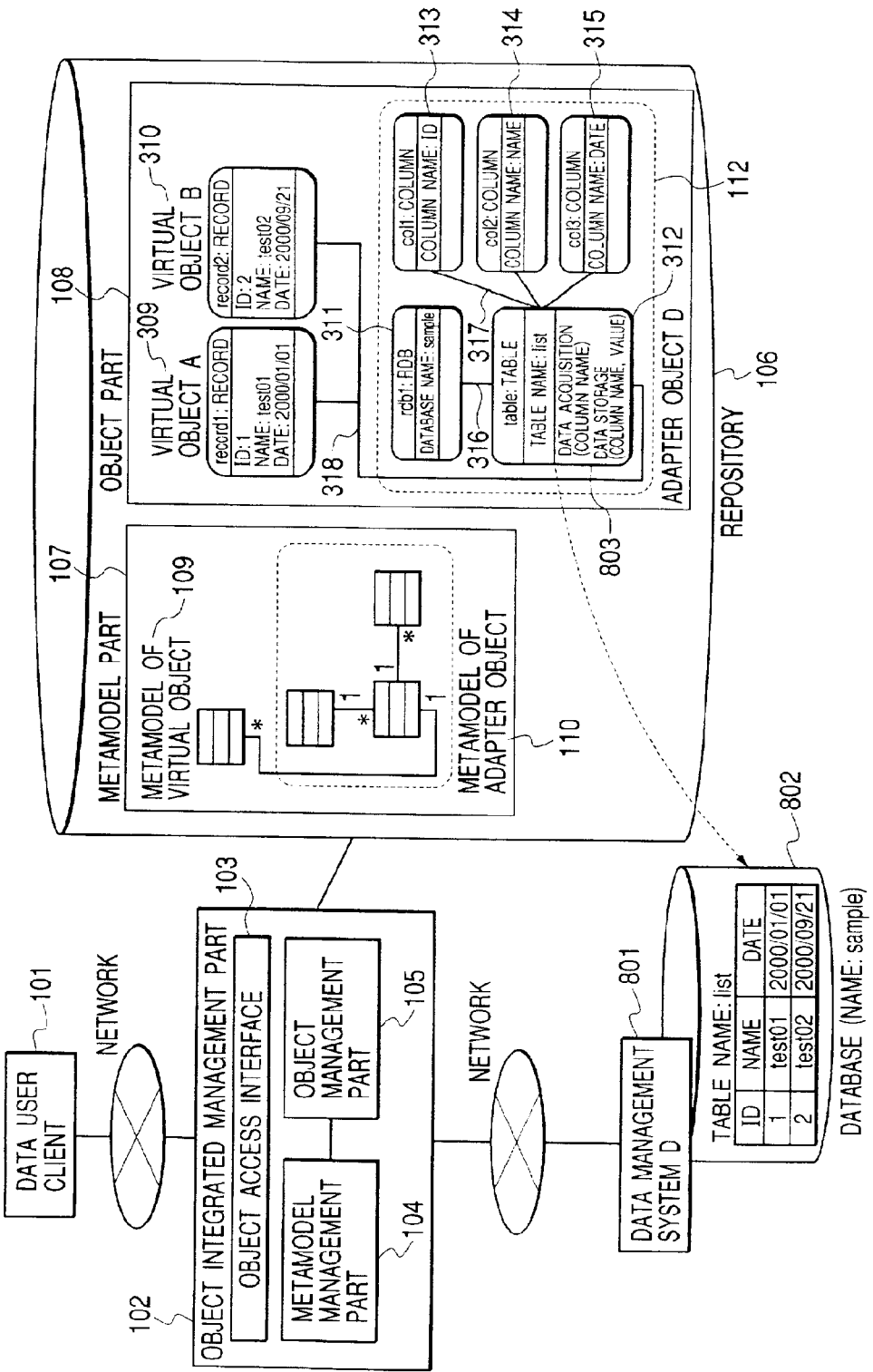
FIG. 8 is a diagram showing the structure of objects when a data user refers to objects managed in the object integrated management part.
Figure 9:
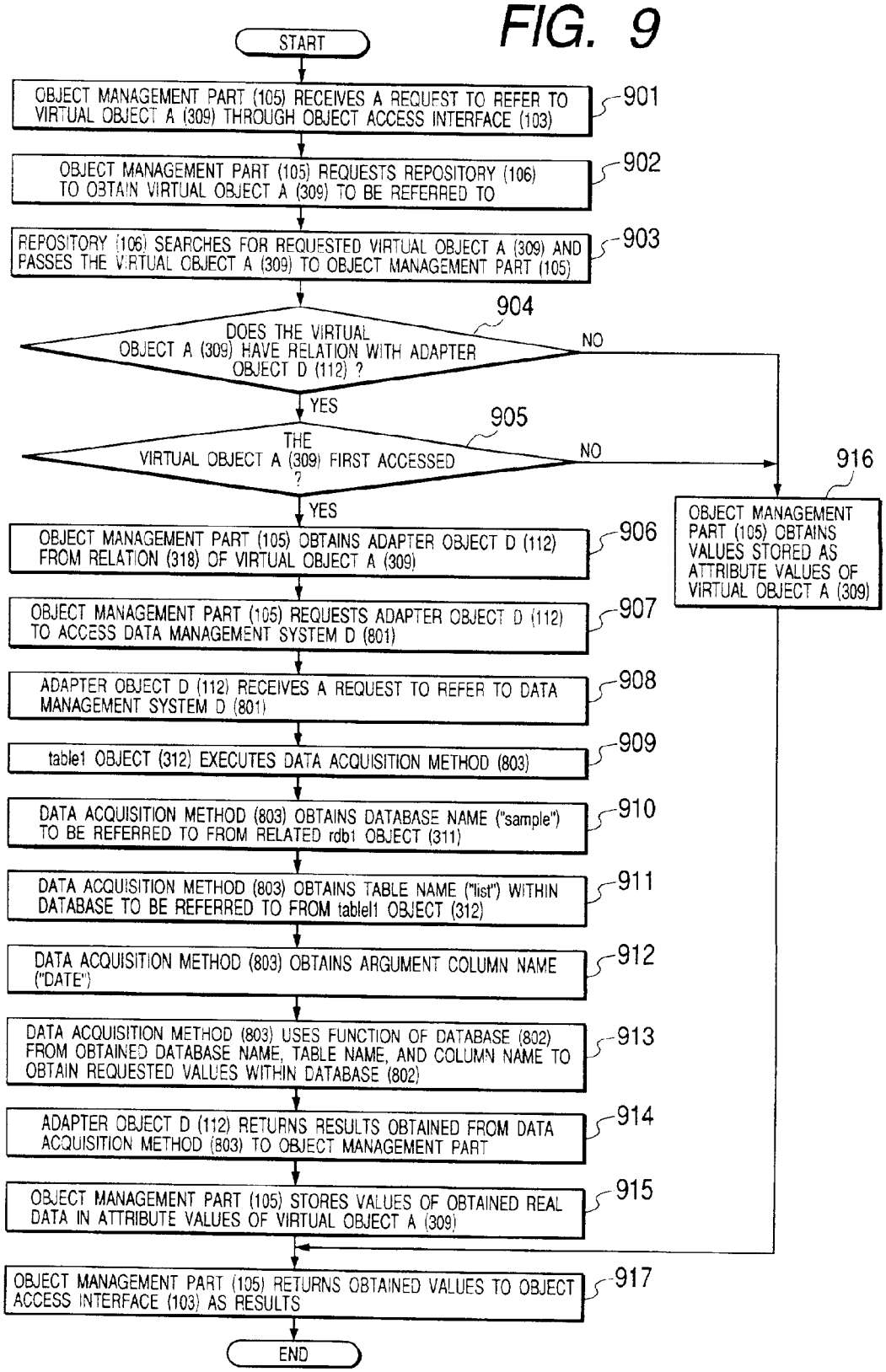
FIG. 9 is a flowchart showing processing when a data user refers to objects managed in the object integrated management part.

FIG. 8 shows how a data user refers to objects by using an object integrated management system in the case where real data is stored in a relational database. This processing will be described with reference to a flowchart of FIG. 9. The data user (101) can access in a unified manner various objects managed in an integrated manner by using the object access interface (103) provided by the object integrated management part (102). On receiving a request to refer to a virtual object A (309), the object access interface (103) passes the request to the object management part (105) (901).

The object management part (105) uses the function of the repository (106) to search for and obtain the virtual object A (309) (902, 903). The virtual object A (309) corresponds to a record (real data) having ID of 1 in a list table held in a database (802) of a data management system D (801). Therefore, to actually obtain the values of a name and date, the object management part (105) obtains an adapter object D (112) associated with the virtual object A (309) (906) and uses it to refer to the values of the real data (907).

At this time, to access the database (802) of the data management system D (801), the adapter object D (112) obtains a database name from a rdb 1 object (311) (910), a table name from a table 1 object (312) (911), and column names from col1 (312), col2 (313), and col3 (314) objects (912), whereby a data acquisition method (803) uses an access language provided by the database (802) to obtain the values of real data (913). The obtained values are returned to the data user (101) as return values of the object access interface (103) (915, 917). The values of real data once obtained are stored as attribute values of the virtual object (915). Thereby, for second and subsequent reference requests, without having to access the real data, the attribute values held in the virtual object are immediately returned (916), resulting in increased access processing efficiency for object reference. However, if real data held in the data management system is frequently updated, the value of the real data is referred to each time.

Virtual objects stored in the object part of the repository (106) may sometimes be not associated with adapter objects. This occurs in the case where objects are managed directly in the repository (106) as real data, and for such virtual objects, the object management part (105) refers to the attribute values of the virtual objects by condition evaluation of (904) and returns their values.

Figure 10:
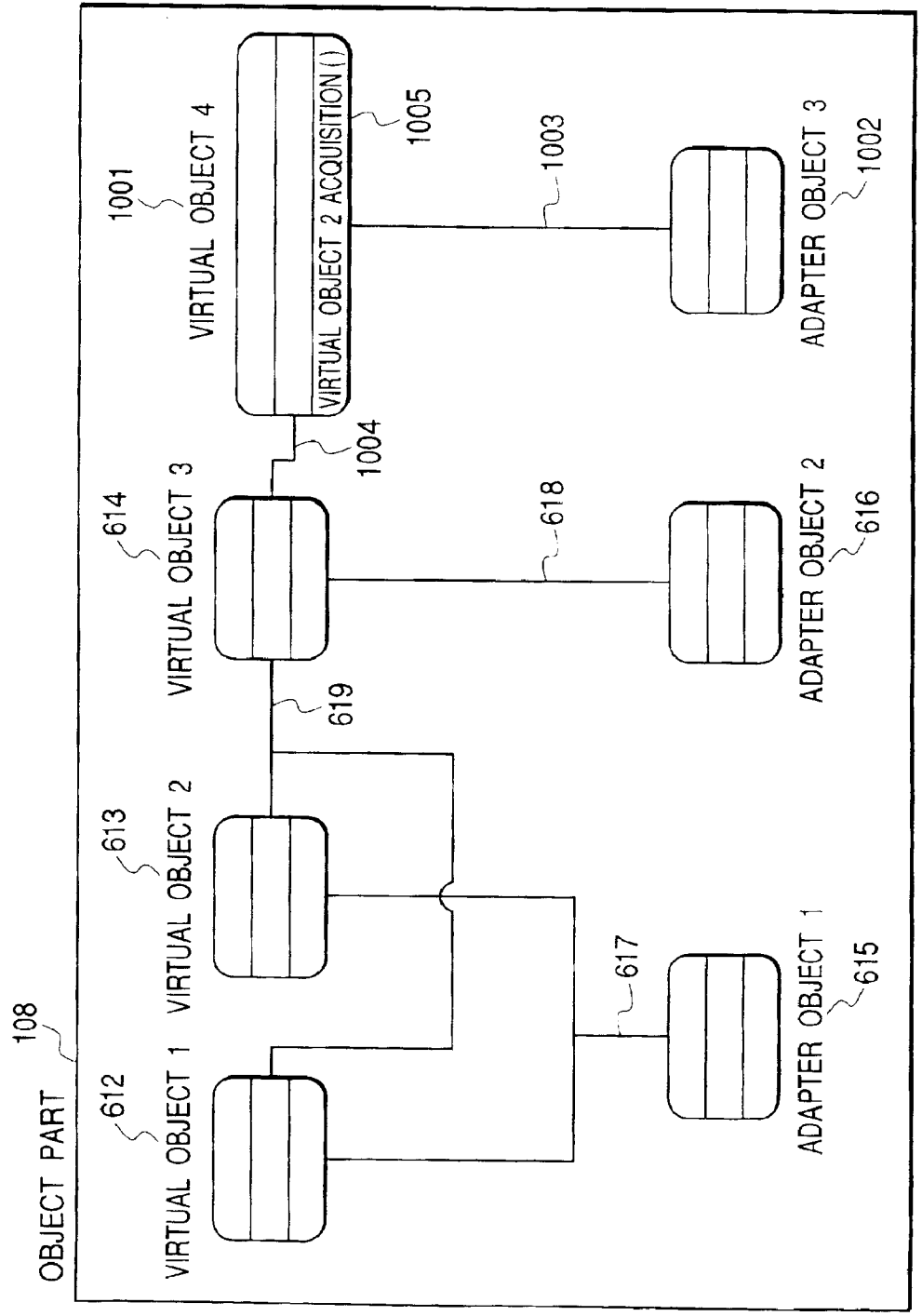
FIG. 10 is a diagram showing the structure of objects when user customize processing is included in a virtual object.
Figure 11:
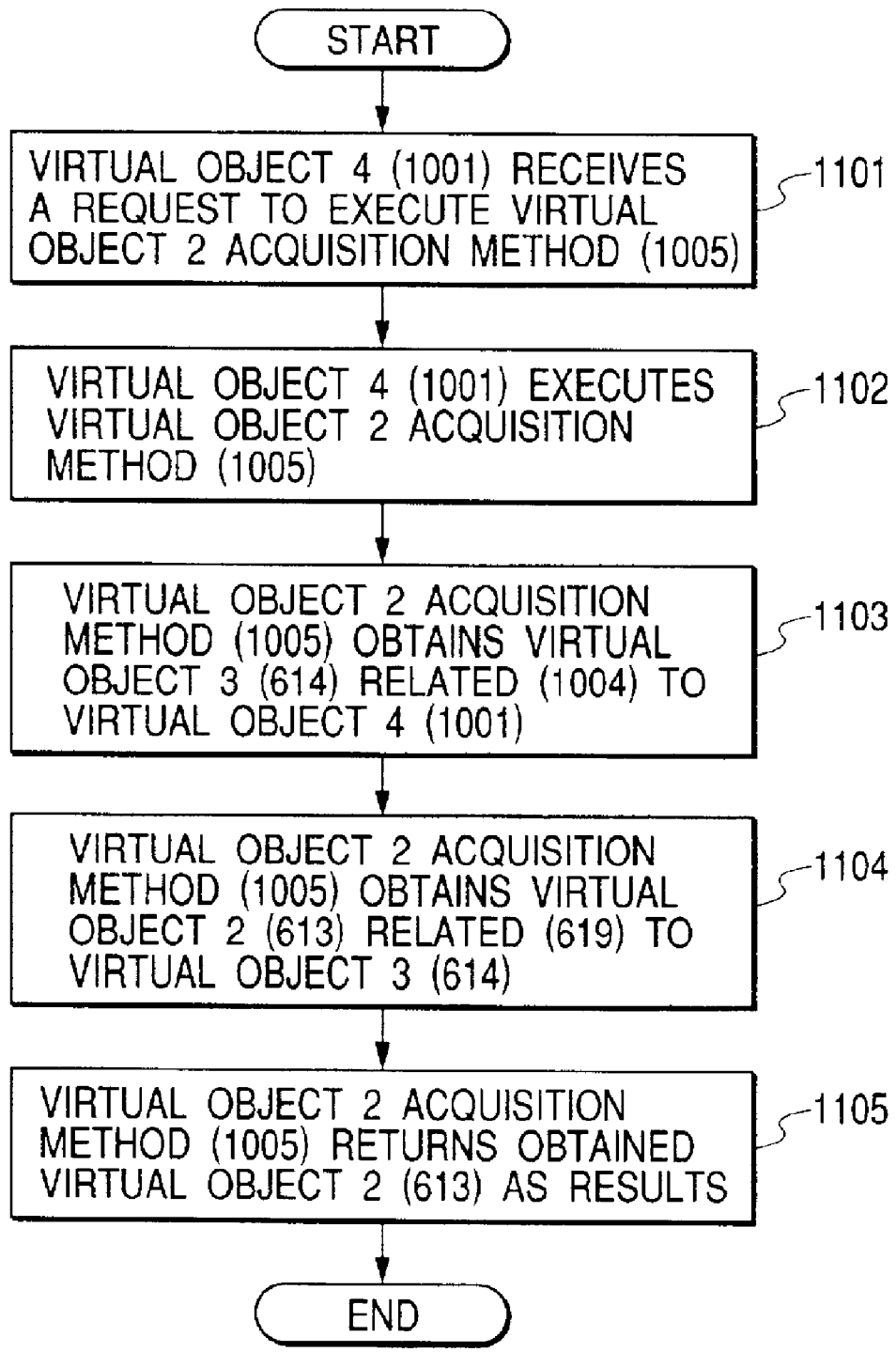
FIG. 11 is a flowchart of user customize processing in a virtual object.

FIG. 10 shows, as an example of application of an object integrated management system, a method for including processing by which the data user (101) efficiently manipulates desired objects by using relation information in virtual objects. This example will be described with reference to a flowchart of FIG. 11. In processing for object integrated management, in some cases, it is necessary to follow relations among different objects to obtain a set of required objects. At this time, if the data user obtains desired objects one at a time, object reference efficiency would be low, and the amount of data flowing through a network between the data user and the object integrated management system would increase, so that it would take much time to obtain all required objects.

Accordingly, in an object integrated management system of the present invention, just as a data acquisition method is included in adapter objects, a method for performing user customize processing can be included in virtual objects. For example, consider the processing of obtaining a virtual object 2 (613) related to a virtual object 4 (1001). In the case where objects are obtained one at a time by following relations between objects, a virtual object 3 (614) related (1004) to the virtual object 4 (1001) would be obtained and then the virtual object 2 (613) related (619) to the virtual object 3 (614) would be obtained.

In this case, the virtual object 3 (614) would be exchanged between the data user and the object integrated management system. This is wasteful processing. Accordingly, a virtual object 2 acquisition method (1005) is included in a metamodel definition of the virtual object 4 (1001). A first step to obtain the virtual object 2 (613) related to the virtual object 4 (1001) is to execute the virtual object 2 acquisition method (1005) of the virtual object 4 (1001) (1101, 1102). The virtual object 2 acquisition method (1005) obtains a related (1004) virtual object 3 (614) within the object part (108) (1103), and further obtains a related (619) virtual object 2 (613) (1104). The virtual object 2 acquisition method (1005) returns the obtained virtual object 2 (613) to the data user (1105).

This eliminates wasteful data exchange between the data user and the object integrated management system and makes it possible to add the efficient processing that performs complicated object manipulations using plural objects within the object part (108) and returns only the result of the processing. This user customize processing, included in a virtual object metamodel definition, can be used in all virtual objects, which are instances thereof.

Figure 12:
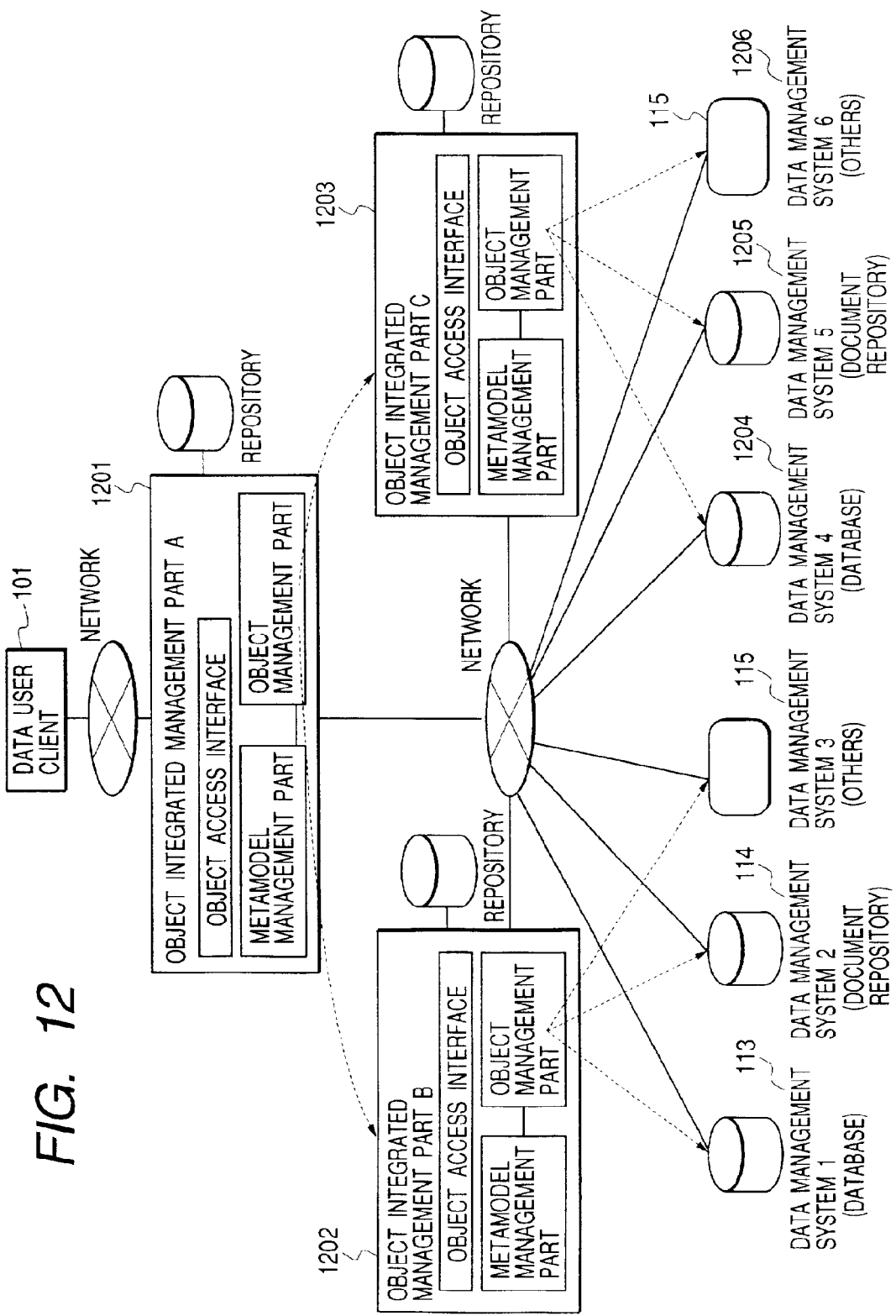
FIG. 12 is a diagram showing a hierarchy of an object integrated management system.

FIG. 12 shows an hierarchical structure of a large object integrated management system. The object integrated management part A (1201) treats an object integrated management part B (1202) and an object integrated management part C (1203) respectively as one data management system. This becomes possible by providing an adapter object in which the processing that refers to objects by an object access interface of the object integrated management system is included.

When the two object integrated management parts (1202, 1203) respectively manage plural data management systems (113 to 115), the data user (101), by accessing the object integrated management part A (1201), can access real data held in all data management systems (1202, 1203, 113 to 115) in a unified manner without considering its hierarchy. Such a scheme helps to build base-distributed systems in a large integrated operation management system that manages various types of objects in an integrated manner.

According to the present invention, in an object integrated management system that manages real data held in various data management systems in an integrated manner, the data management systems can be easily added or deleted, and costs required for system management, building, and maintenance can be reduced.

What is claimed is:

1. An object integrated management system that manages real data managed by data management systems in an integrated manner, comprising:

a repository that stores virtual objects respectively created correspondingly to real data each of which exists in different data management systems, virtual object metamodels defining the virtual objects, adapter objects having configuration information of said data management systems and a function of access processing for real data stored in said data management systems, and adapter object metamodels defining said adapter objects, a first relation being defined between the adapter object and a corresponding set of the virtual objects and a second relation being defined between the adapter object metamodel and the corresponding virtual object metamodel;

a metamodel management part that manages said virtual object metamodels and said adapter object metamodels within said repository and sets the second relations; and an object management part that manages said virtual objects and said adapter objects, sets the first relations, and uses said adapter objects to access real data.

2. An object integrated management system that manages the respective real data of plural data management systems managing real data in an integrated manner, comprising:

a repository that stores virtual objects respectively created correspondingly to real data each of which exists in different data management systems, a virtual object metamodel defining the virtual objects, an adapter object having configuration information of said data management system and a function of access processing for real data stored in said data management system, and an adapter object metamodel defining said adapter object, a first relation being defined between the adapter object and a corresponding set of the virtual objects and a second relation being defined between the adapter object metamodel and the corresponding virtual object metamodel;

a metamodel management part that manages said virtual object metamodel and said adapter object metamodel within said repository and sets the second relation; and an object management part that manages said virtual objects and said adapter object, sets the first relation, and uses said adapter object to access real data, wherein;

upon receipt of a request to add a new data management system for integrated management system, said metamodel management part stores a virtual object metamodel and an adapter object metamodel corresponding to the new data management system in said repository; and after the second relation is set between the virtual object metamodel and the adapter object metamodel, virtual objects and adapter objects are formed as the respective instances of said virtual object metamodel and adapter object metamodel newly stored in the repository.

3. An object integrated management system that manages real data managed by data management systems in an integrated manner, comprising:

a repository that stores virtual objects respectively created correspondingly to real data each of which exists in different data management systems, virtual object metamodels defining the virtual objects, adapter objects having configuration information of said data management systems and a function of access processing for real data stored in said data management systems, and adapter object metamodels defining said adapter objects, a first relation being defined between the adapter object and a corresponding set of the virtual objects and a second relation being defined between the adapter object metamodel and the corresponding virtual object metamodel;

a metamodel management part that manages said virtual object metamodels and said adapter object metamodels within said repository and sets the second relations; and an object management part that manages said virtual objects and said adapter objects and sets the first relations, and uses said adapter objects to access real data, wherein upon receipt of a request to refer to a virtual object, said object management part obtains the requested virtual object from said repository, obtains an adapter object associated with the requested virtual object, and uses the obtained adapter object to refer to the value of real data.

* * * * *